United States Patent [19]
Van Wonderen et al.

[11] Patent Number: 5,510,071
[45] Date of Patent: Apr. 23, 1996

[54] METHOD AND APPARATUS FOR PRODUCTION OF TUBING

[75] Inventors: Lenard Van Wonderen, Varna; Joseph F. Bengough, Hensall; Carl D. Chapman, Stratford; Frederick A. Kime, London, all of Canada

[73] Assignee: Big "O" Inc., Exeter, Canada

[21] Appl. No.: 182,181

[22] PCT Filed: Sep. 25, 1992

[86] PCT No.: PCT/CA92/00422

§ 371 Date: Feb. 4, 1994

§ 102(e) Date: Feb. 4, 1994

[51] Int. Cl.$^6$ ................................................. B29C 53/50
[52] U.S. Cl. ................ 264/166; 264/508; 264/167; 264/209.3; 264/210.2; 264/286; 425/325; 425/326.1; 425/396; 425/451
[58] Field of Search .................................. 425/395, 396, 425/450.1, 451, 325, 327, 326.1; 264/166, 167, 508, 209.3, 210.2, 286

[56] References Cited

U.S. PATENT DOCUMENTS

| | | | |
|---|---|---|---|
| 3,768,954 | 10/1973 | Marsh et al. | 425/451 |
| 4,212,618 | 7/1980 | Hegler et al. | |
| 4,319,872 | 3/1982 | Lupke et al. | 264/508 |
| 4,702,688 | 10/1987 | Schenk | 425/451 |
| 4,781,568 | 11/1988 | Inaba | 425/451 |
| 4,787,598 | 11/1988 | Rahn et al. | |
| 4,911,633 | 3/1990 | Comfort | 425/396 |
| 5,002,478 | 3/1991 | Lupke | 425/96 |
| 5,017,321 | 5/1991 | Comfort | 264/167 |
| 5,167,894 | 12/1992 | Baumgarter | 425/327 |
| 5,174,939 | 12/1992 | Siegenthaler | 264/167 |

FOREIGN PATENT DOCUMENTS

| | | |
|---|---|---|
| 1934243 | 1/1971 | Germany. |
| 4007608 | 9/1991 | Germany. |
| 1231682 | 5/1971 | United Kingdom. |

Primary Examiner—Mathieu D. Vargot
Attorney, Agent, or Firm—Stevens, Davis, Miller & Mosher

[57] ABSTRACT

A method and apparatus for production of smooth or corrugated small and large diameter thermoplastic tubing and composite tubular structures. The apparatus includes a supporting framework, a plurality of mold carriages mounted on said framework for reciprocal linear travel therealong, at least one mold block mounted on each of said mold carriages, each said mold block comprising a pair of opposed semi-cylindrical segments mounted on a carriage for transverse linear reciprocal travel therealong for closing and opening of said mold block, an actuating mechanism for moving said opposed mold segments towards and away from each other, and a single actuating mechanism for selectively moving said carriages.

7 Claims, 5 Drawing Sheets

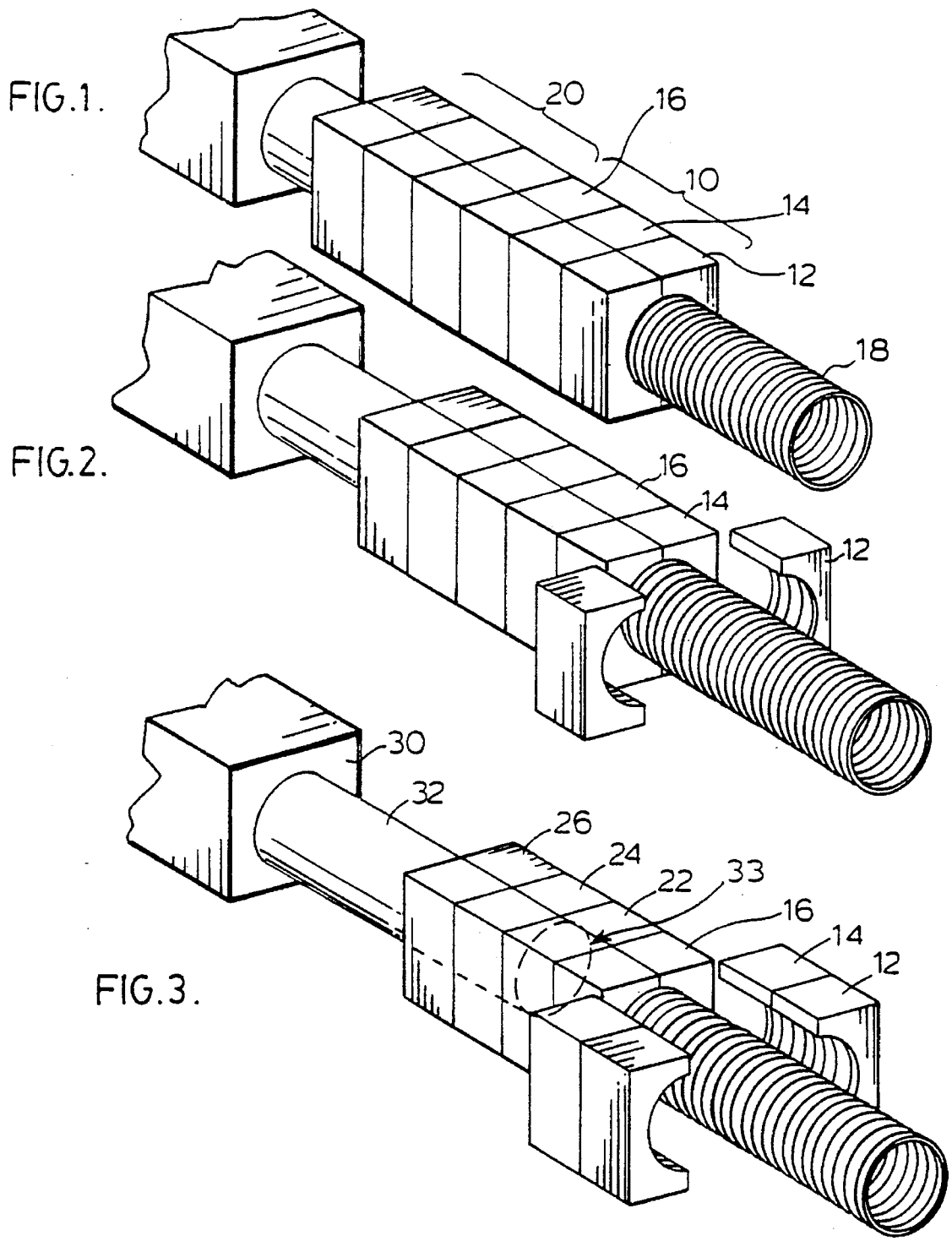

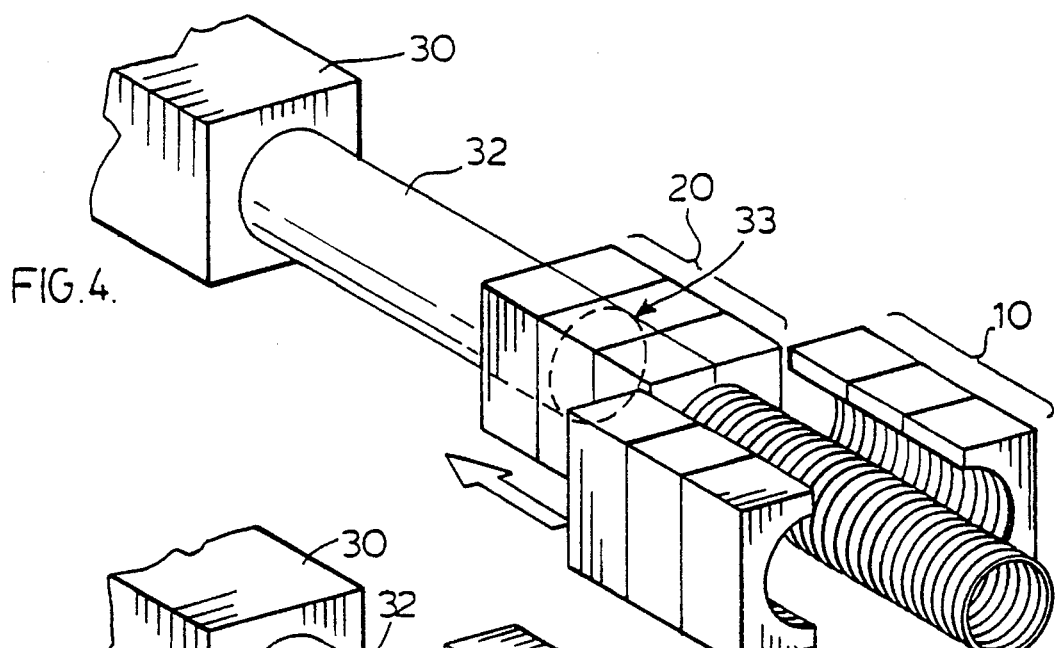
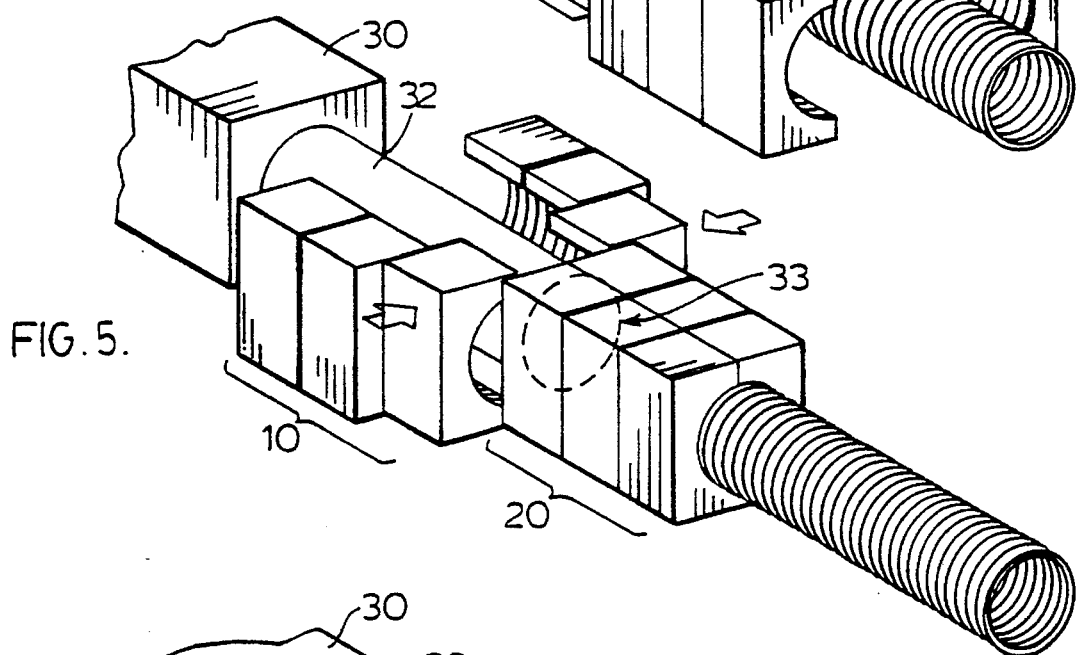
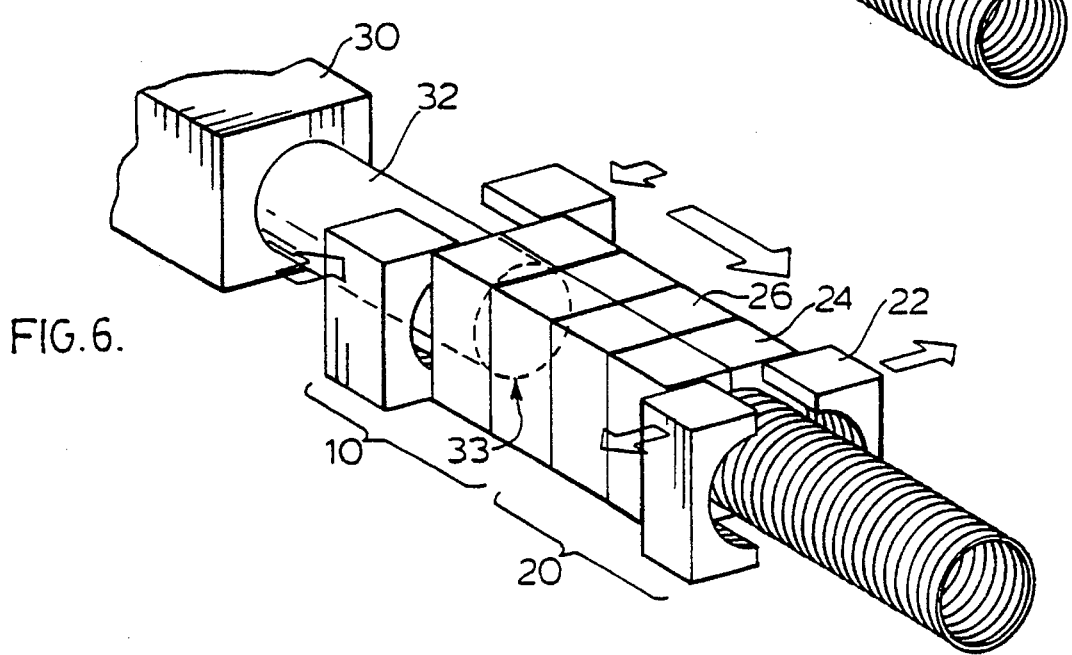

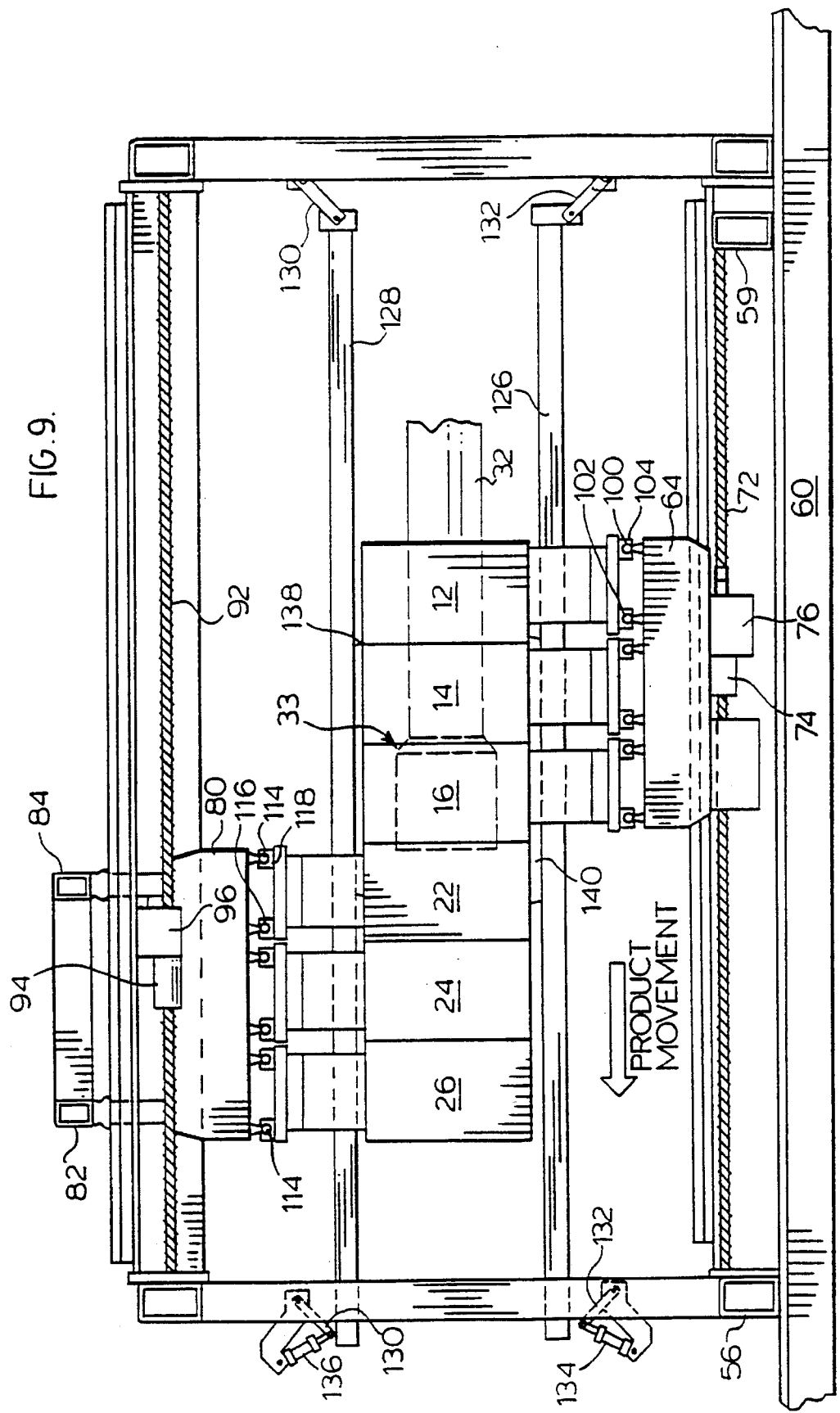

METHOD AND APPARATUS FOR PRODUCTION OF TUBING

BACKGROUND OF THE INVENTION

This invention relates to the production of thermoplastic tubing and, more particularly, relates to a method and apparatus for producing small and large diameter thermoplastic tubing and composite tubular structures.

U.S. Pat. No. 4,911,633 issued March 27, 1990 discloses an apparatus for producing plastic tubing in which a plurality of mold carriages each supporting a pair of clam shell mold blocks is mounted in a framework for reciprocal linear travel. First actuating means are employed for moving the carriages to an extrusion station, second actuating means are employed for opening and closing the clam shell mold blocks carried by the carriages, and third actuating means are employed for returning the carriages rearwardly to a start position.

It is a principal object of the present invention to provide a single actuating means for moving the carriages and associated mold blocks in a reciprocal linear path to and from an extrusion station, thereby simplifying construction and operation of the apparatus.

It is another object of the present invention to provide an improved actuating means for closing and opening the mold blocks prior to and after molding of plastic tubing and composite tubular structures therein.

SUMMARY OF THE INVENTION

In accordance with a preferred embodiment of the present inventions the actuating means for moving mold blocks along a linear path within a framework to and from an extrusion station are simplified by incorporating a plurality of actuating means into a single actuating means, thereby reducing costs, complexity of operation, and enhancing reliability of operation.

In its broad aspect, the apparatus of the invention for the production of thermoplastic tubing and composite tubular structures comprises, in combination, a supporting framework, a plurality of mold carriages mounted on said framework for reciprocal linear travel therealong, at least one mold block mounted on each of said mold carriages, each said mold block comprising a set of opposed mold segments mounted on a carriage for transverse linear reciprocal travel therealong for closing and opening of said mold block, actuating means for moving said opposed mold segments towards and away from each other, and actuating means for selectively moving said carriages with closed mold blocks along a linear path to an extrusion station and for selectively returning said carriages with open mold blocks along said linear path rearwardly past closed mold blocks.

In general, a first mold carriage is mounted for reciprocal linear travel on the framework on one side of the linear path and a second mold carriage is mounted for reciprocal linear travel on the framework on the diametrically opposite side of the linear path. The said linear path may be horizontal, vertical or inclined at an angle between the horizontal and vertical.

More particularly, in a preferred embodiment, a lower mold carriage is mounted for reciprocal linear travel on a lower portion of the framework and an upper mold carriage is mounted for linear reciprocal travel on an upper portion of the framework, and the actuating means for moving a plurality of mold carriages for reciprocal linear travel within the supporting framework preferably comprises a ball nut drive for each of the lower and upper carriages. The actuating means for closing and opening each set of opposed mold segments for transverse reciprocal linear travel preferably comprises a pair of transverse spaced-apart guide rails mounted on a mold carriage, means secured to each of the mold segments for guided reciprocal travel on the guide rails, and a piston cylinder assembly operatively interconnecting each mold segment to the respective mold carriage for extending and retracting the mold segments away from and towards each other.

BRIEF DESCRIPTION OF THE DRAWINGS

The method and apparatus of the invention will now be described in detail with reference to the accompanying drawings, in which:

FIGS. 1–6 diagrammatically illustrate the operation of the invention for the continuous production of thermoplastic tubing;

FIG. 9 is a side elevation of the apparatus shown in FIG. 7.

DESCRIPTION OF THE PREFERRED EMBODIMENT

Figure 7:
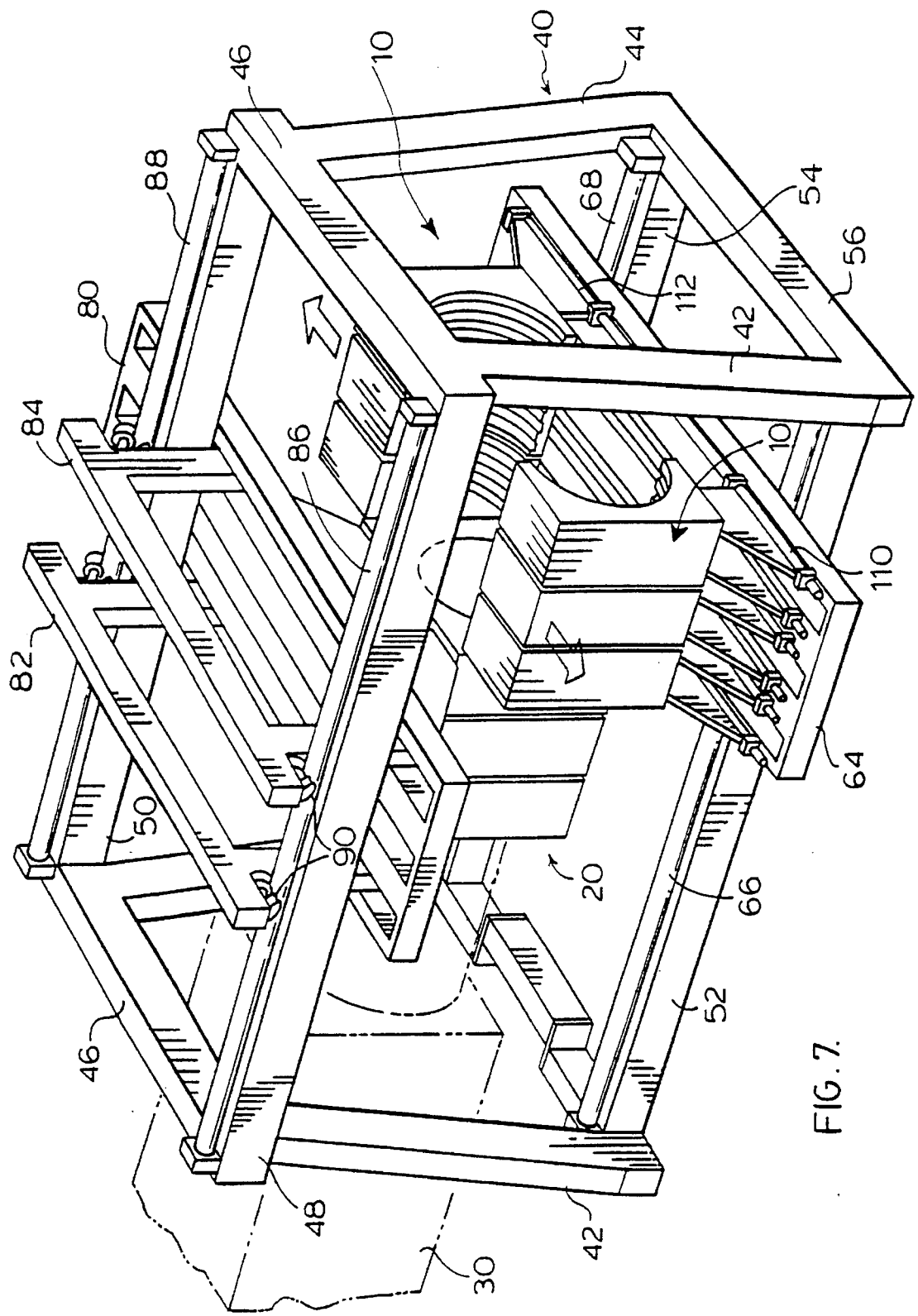
FIG. 7 is a perspective view of the apparatus of the invention, corresponding to FIG. 3, showing the full opening of a set of opposed semi-cylindrical segments of the mold blocks.

With reference now to FIGS. 1–6, the method of operation of the apparatus of the invention will be described to provide a perspective of the function of the apparatus. A first set 10 of three mold blocks 12, 14 and 16 is shown in FIGS. 2, 3 and 4 to be opening in sequence as cylindrical plastic pipe or tubing 18 is continually formed and released to the right, as viewed in the figures. FIG. 4 indicates the return of the opened mold blocks 10 past closed mold block set 20 to a start position, to the left as viewed in the figures, for their sequential closing as indicated in FIGS. 5 and 6.

The second set of mold blocks 20 concurrently continues to advance to the right as the segments of the mold blocks of set 10 are sequentially opened and eventually returned as a set to the start position where the mold blocks sequentially close. The mold blocks comprising set 20 have then advanced to the position as shown FIG. 6, at which time the lead mold block 22 opens to begin the sequential opening of associated mold blocks 24 and 26 preparatory to their return to the start position past the closed set 10 The number of mold blocks can vary for the desired function and, although the description will proceed with reference to a pair of sets of three mold blocks having cylindrical cavities, it will be understood that this is representative only of a preferred embodiment of the invention. The mold cavities, for example, can be cylindrical with corrugated or smooth walls, or can be square or other desired shapes.

Numeral 30 depicts an extruder having an extension pipe 32 for feeding molten plastic to an extrusion station indicated generally by numeral 33. One or more extruders, extension pipes and dies can be used, as desired.

Figure 8:
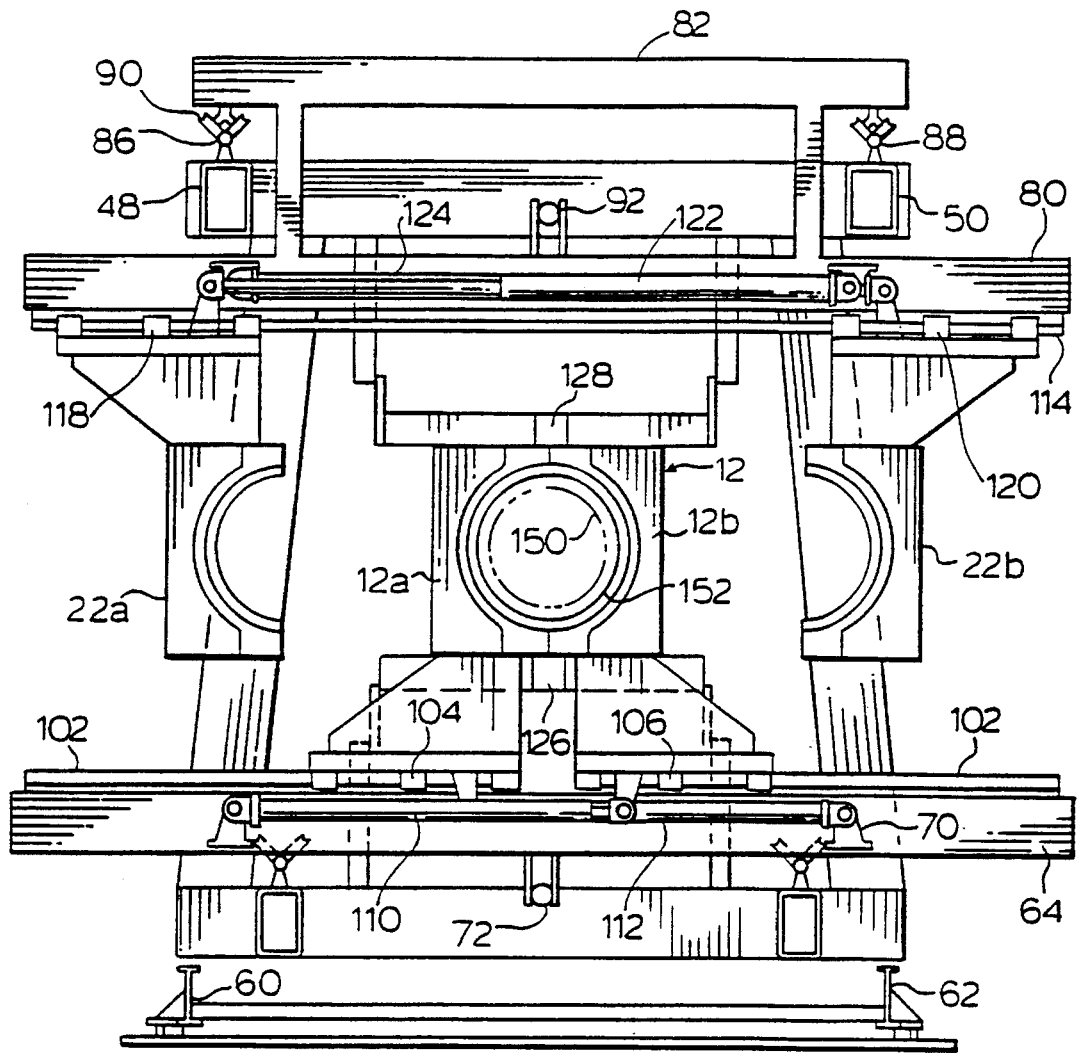
FIG. 8 is an end elevation of the apparatus shown in FIG. 7 with a set of upper mold blocks in its opened configuration.

With reference now to FIGS. 7, 8 and 9, the apparatus is shown in more detail wherein structural steel framework 40 comprises upright corner posts 42, 44 at each end of the framework, preferably upwardly inwardly inclined and joined by upper cross beams 46 for receiving longitudinal support beams 48, 50. Lower longitudinal beams 52, 54 are shown connected to transverse lower beams 56, 58 to form a rigid unitary framework structure seated on longitudinal platform rails 60, 62, as shown in FIGS. 8 and 9.

Set 10 of mold blocks 12, 14 and 16 is mounted on first or lower mold carriage 64 which is adapted for longitudinal linear reciprocal travel on bottom rails 66, 68 by means of a pair 70 of perpendicular rollers journalled for rotation in the underside of carriage 64, at each corner thereof. With reference to FIG. 9, fixed ball screw 72, rigidly secured at each end to transverse members 56, 59, operatively receives a ball nut drive 74 driven by electric motor 76 secured to the underside of carriage 64. Actuation of motor 76 in a clockwise or counter-clockwise direction will rotate ball nut drive 74 threaded onto ball screw 72 for selective linear travel of carriage 64 to the right or to the left as viewed in FIGS. 7 and 9. The use of electrical signal componentry, not shown, allows precise positioning of said carriage along the longitudinal axis.

Set 20 of mold blocks 22, 24, 26 is mounted below second or upper carriage 80 which is suspended from cross beams 82, 84. Cross beams 82, 84 are mounted for longitudinal linear reciprocal travel on upper rails 86, 88 by pairs 90 of perpendicular rollers journalled for rotation thereon.

Fixed threaded ball screw 92 operatively receives ball nut drive 94 driven by electric motor 96 secured to the upper side of carriage 80 for selective longitudinal linear reciprocal travel of carriage 80 within framework 40. With electrical signal componentry employed, precise positioning of said carriage along the longitudinal axis is attainable. Alternatives such as pneumatic or hydraulic motors can be substituted for electric motors on any of the carriages.

Each of mold blocks 12, 14 and 16 is mounted on a pair of spaced apart transverse guide rails 100, 102 by slide blocks 104, 106 secured to the opposed segments 12a, 12b respectively of mold blocks 12, for example. The opposed segments 12a, 12b of mold block 12 are moved towards each other and away from each other on transverse guide rails 100, 102 by piston cylinder assemblies 110, 112 respectively, which are pivotally connected at one end to lower carriage 64 and at the other end to the underside of each of mold segments 12a, 12b, as shown in FIG. 8.

Upper set 20 of mold blocks 22, 24 and 26 are suspended from upper mold carriage 80 by transverse rails 114, 116 and secured thereto by slide blocks 118 connected to the upper side of said mold blocks. The upper mold blocks are opened and closed by extending and retracting piston-cylinder assemblies 122, 124, and are shown in the extended open position as typified by component 22a, 22 b of mold blocks 22 in FIG. 8. Actuation of the mold block segments is not limited to the use of hydraulic piston cylinder assemblies and other comparable actuating means such as rack and pinion drives, lead screws, chains and the like may be used.

Upper and lower vacuum supplies 126, 128 are operatively connected to lower and upper mold sets 10 and 20 respectively for positioning relative to the extrusion die 33. Vacuum supplies 126 and 128 are pivotally connected at their ends by linkages 130, 132 at opposite ends of the framework whereby actuation of piston-cylinder assemblies 134, 136 will raise or lower the vacuum lines 126, 128 as necessary for adjustment of the respective heights of vacuum manifolds, 138, 140 connected thereto (FIG. 9). Liquid cooling of the mold blocks can be provided by a similar arrangement of, for example, water cooling lines in communication with the mold segments.

Although a pair of diametrically opposed, first and second, upper and lower mold carriages are described, it will be further understood that third or forth carriages adapted for linear reciprocal travel at 120° or 90° to each other respectively can be incorporated within the present apparatus.

In operation, extruder 30 supplies a single or plurality of tubular films of molten plastic from one or more extrusion dies 150 (FIG. 8) at the end of extrusion extension pipe 32 at the extruding station depicted by numeral 33 into the mold cavity 152 defined by closed mold blocks at the extrusion station. With reference now to FIGS. 1 and 6, the closed mold blocks travelling at a uniform predetermined speed to the right as viewed in the figures by the controlled actuation of upper and lower motors 76, 96 driving their respective ball nut drives 74, 94, form the plastic pipe with the assistance of the vacuum provided by vacuum supplies 126, 128. In the particular embodiment shown in the drawings, which is understood to be exemplary only of the utility of the invention, a corrugated pipe 18 is formed which continuously travels to the right (FIGS. 1–7) with the mold blocks as it cools and solidifies. Pipe 18 is formed and travels to the left, as viewed in FIG. 9.

Mold blocks 12, 14 and 16 are sequentially opened as the plastic cools to a solid state by controlled actuation of the respective piston cylinder assemblies 110, 112 until all the molds of set 10 are fully opened, at which time lower motor 76 is reversed to reverse the rotation of ball nut drive 74 on fixed ball screw 72 to return carriage 64 to its start position as shown in FIG. 5. The transverse piston cylinder assemblies 110, 112 are then retracted to close the opposed segments of the mold blocks for resumption of travel to the right as viewed in the figures.

The upper set 20 of mold blocks 22, 24 and 26 is likewise advanced to the right as viewed in the drawings to an extrusion die at the extrusion station 33 and the mold blocks are sequentially opened after advancing past the extrusion station, a depicted in FIG. 6. When all of mold blocks 22, 24 and 26 are opened in sequence, the set of 20 of opened mold blocks is returned to the start position by reversing motor 96 and the rotation of ball nut drive 94 on fixed ball screw 92. The actual timing and positions of opening and closing of mold blocks are generally represented by FIGS. 1–6.

The present invention provides a number of important advantages. Smooth walled or corrugated pipe of large and small diameter can be readily continuously manufactured by a simple operation of reciprocal longitudinal travel of a pair of carriages disposed for upper and lower travel within a framework. The opposed segments of each mold block close and open by reciprocal linear travel in a direction transverse to the longitudinal travel of the mold carriages, thereby providing a positive closing of the mold blocks while permitting the use of a single actuating means for moving the carriages in both longitudinal directions of travel°

It will be understood, of course, that modifications can be made in the embodiment of the invention illustrated and described herein without departing from the scope and purview of the invention as defined by the appended claims.

We claim:

1. An apparatus for the production of thermoplastic pipe or tubing comprising, in combination, a supporting framework, a plurality of mold carriages mounted on said framework for reciprocal linear travel along a linear path, at least one mold block mounted on each of said mold carriages, each of said mold blocks comprising a set of opposed mold segments mounted on a carriage for transverse linear reciprocal travel therealong for closing and opening of said mold block, actuating means mounted on the carriage for moving said opposed mold segments towards and away from each other on the carriage and single actuating means for selectively moving said carriages with closed mold blocks along the linear path to an extrusion station and for selectively returning said carriages with open mold blocks along said linear path rearwardly past closed mold blocks.

2. An apparatus as claimed in claim 1, in which said linear path may be horizontal, vertical or inclined at an angle between the horizontal and vertical angle and in which a first mold carriage is mounted on the framework for reciprocal linear travel on one side of the linear path and a second mold carriage is mounted for reciprocal linear travel on the diametrically opposite side of the linear path.

3. An apparatus as claimed in claim 1 in which said plurality of mold carriages comprises a lower mold carriage mounted for reciprocal linear travel on a lower portion of the framework and an upper mold carriage mounted for reciprocal linear travel on an upper portion of the framework.

4. An apparatus as claimed in claim 1, in which each of said opposed mold segments is semi-cylindrical.

5. An apparatus as claimed in claim 4 in which said single actuating means for selectively moving said lower and upper carriages along the linear path comprises a pair of spaced apart fixed ball screws disposed longitudinally within the framework, a ball nut drive operatively connecting each carriage to a ball screw, and motor means for selectively rotating each ball nut drive.

6. An apparatus as claimed in claim 1, in which the actuating means for opening and closing each set of opposed mold segments comprises a pair of transverse spaced-apart guide rails, means secured to each of the mold segments for guided reciprocal travel on the guide rails, and a piston cylinder assembly operatively interconnecting each mold segment to the respective mold carriage for extending and retracting the mold segments away from and towards each other.

7. A method for the production of thermoplastic pipe or tubing comprising, in combination, providing in a supporting framework a plurality of mold carriages mounted on said framework for reciprocal linear travel by single actuating means along a linear path, mounting at least one mold block having a pair of opposed mold segments on each of said mold carriages with actuating means mounted on the carriage for transverse linear reciprocal travel therealong for closing and opening of said mold block moving opposed mold segments towards and away from each other, and selectively moving said carriages with closed mold blocks along the linear path to an extrusion station and selectively returning said carriages with open mold blocks along said linear path rearwardly past closed mold blocks with said single actuating means.

* * * * *